United States Patent
Noma et al.

(10) Patent No.: US 6,922,437 B2
(45) Date of Patent: Jul. 26, 2005

(54) MODEM APPARATUS, COMMUNICATION APPARATUS AND COMMUNICATION CONTROL METHOD

(75) Inventors: Nobuhiko Noma, Yokohama (JP); Mikio Mizutani, Tokyo (JP); Toshiyuki Ougi, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 847 days.

(21) Appl. No.: 09/811,585

(22) Filed: Mar. 20, 2001

(65) Prior Publication Data

US 2001/0026582 A1 Oct. 4, 2001

(30) Foreign Application Priority Data

Mar. 30, 2000 (JP) .................................... 2000-094257

(51) Int. Cl.$^7$ .............................. H04B 1/38; H04L 5/16
(52) U.S. Cl. ..................................................... 375/222
(58) Field of Search ............................... 375/222, 260; 704/400, 404; 370/503

(56) References Cited

U.S. PATENT DOCUMENTS 6,279,022 B1 * 8/2001 Miao et al. .................. 708/404
6,519,291 B1 * 2/2003 Dagdeviren et al. ........ 375/260

FOREIGN PATENT DOCUMENTS

| EP | 0876031 | 11/1998 |
| JP | 10117178 | 5/1998 |
| JP | 11275046 | 10/1999 |
| JP | 3022854 | 1/2000 |
| WO | 99/65180 | 12/1999 |

OTHER PUBLICATIONS

English Language Abstract of JP Appln. No. 11–275046.
English Language Abstract of JP Appln. No. 3022854.
English Language Abstract of JP Appln. No. 10–117178.

* cited by examiner

*Primary Examiner*—Stephen Chin
*Assistant Examiner*—Curtis Odom
(74) *Attorney, Agent, or Firm*—Greenblum & Bernstein, P.L.C.

(57) ABSTRACT

The present invention calculates a product of the present sampling data by the sampling data one data unit ahead through a multiplier, adds up product values calculated for every sampling by adding product values calculated from previous samples occurring one data unit in advance through an adder and detects a reference timing with regard to a CP (cycle prefix) signal using the addition value.

17 Claims, 7 Drawing Sheets

MODEM APPARATUS, COMMUNICATION APPARATUS AND COMMUNICATION CONTROL METHOD

This application is based on the Japanese Patent Application 2000-094257 filed on Mar. 30, 2000, entire content of which is expressly incorporated by reference herein.

BACKGROUND OF THE INVENTION

1. Field of the Invention

The present invention relates to a modem apparatus using an xDSL technology that allows high-speed communications of several M bits/sec even with a telephone copper wire cable, and more particularly, to a modem apparatus, communication apparatus and communication control method that detect a CP (Cyclic Prefix) signal added to every data unit (a predetermined number of samples) of initializing signals.

2. Description of the Related Art

Against a background of the widespread proliferation of the Internet, there is a growing demand for high-speed access channels available for constant connection of the Internet. Furthermore, optical fibers are increasingly being introduced for backbone of carriers and use of ultra high-speed channels of giga-bit class is beginning in their core sections. On the other hand, most of subscriber channels connecting user residences and a carrier station are copper wire cables installed for telephones. Therefore, the introduction of an xDSL technology, which allows high-speed communications of several M bits/sec with telephone copper wire cables, is under study.

One of the xDSL technologies is an ADSL system. The ADSL system uses carrier frequencies in a band of 35 kHz or higher, which is by far higher than the band used for telephones (4 kHz or below). For this reason, the ADSL system has an advantage of using telephone lines to carry out high-speed data communications without impairment of the telephone functions.

A voice modem using a band of 4 kHz or below sends a training signal prior to data transmission and then sends a data signal. An ADSL modem sends an initializing signal, which is equivalent to the training signal, and then sends a data signal.

FIG. 7 shows a sequence diagram of an initializing signal sent by the ADSL modem. As shown in FIG. 7, the initializing signal has a CP (Cyclic Prefix) signal added at the beginning of every data unit (256 samples in the case of G.Lite) starting at some midpoint of the signal. The CP signal is configured by the same data as that of a predetermined number of samples (16 samples in the case of G.Lite. G.Lite is one technology of the ADSL system and is standardized as G.992.2 by ITU-TS in 1999.) of the rear end of the data unit. That is, the 16 samples of the rear end of the data unit are copied and added at the beginning of the data unit, forming a unit of 272 samples (256+16) as a whole. Adding this CP (Cyclic Prefix) signal at the beginning of every data unit also when a data signal is sent will prevent inter-code interference between data units. This also makes it possible to precisely demodulate a DMT (Discrete Multi Tone) modulated signal adopted by the ADSL system.

However, regardless of high-speed communication based on the ADSL system, the reception terminal cannot determine from which part of the initializing signal a cyclic insertion of the CP (Cyclic Prefix) signal starts. For this reason, it is difficult to directly recognize the boundary between the CP (Cyclic Prefix) signal and signal body. Here, the cyclic insertion refers to adding the rear 16 samples of the data unit at the beginning of the relevant data unit and repeating this procedure for every data unit.

SUMMARY OF THE INVENTION

It is an object of the present invention to provide a modem apparatus, communication apparatus and communication control method capable of accurately detecting a CP (Cyclic Prefix) signal sent at some midpoint of an initializing signal without any detection error and precisely demodulating a DMT-modulated signal.

The present invention calculates a product of present sampling data by sampling data, one data unit ahead, and retroactively adds up product values calculated for every sampling by going back to the time point one data unit ahead. The present invention then detects a reference timing with regard to a CP (Cyclic Prefix) signal using the addition value.

BRIEF DESCRIPTION OF THE DRAWINGS

The above and other objects and features of the invention will appear more fully hereinafter from a consideration of the following description taken in connection with the accompanying drawing wherein one illustrative embodiment of the present invention is illustrated by way of example, in which.

DETAILED DESCRIPTION OF THE PREFERRED EMBODIMENTS

With reference now to the attached drawings, an embodiment of the present invention will be explained in detail below.

Figure 1:
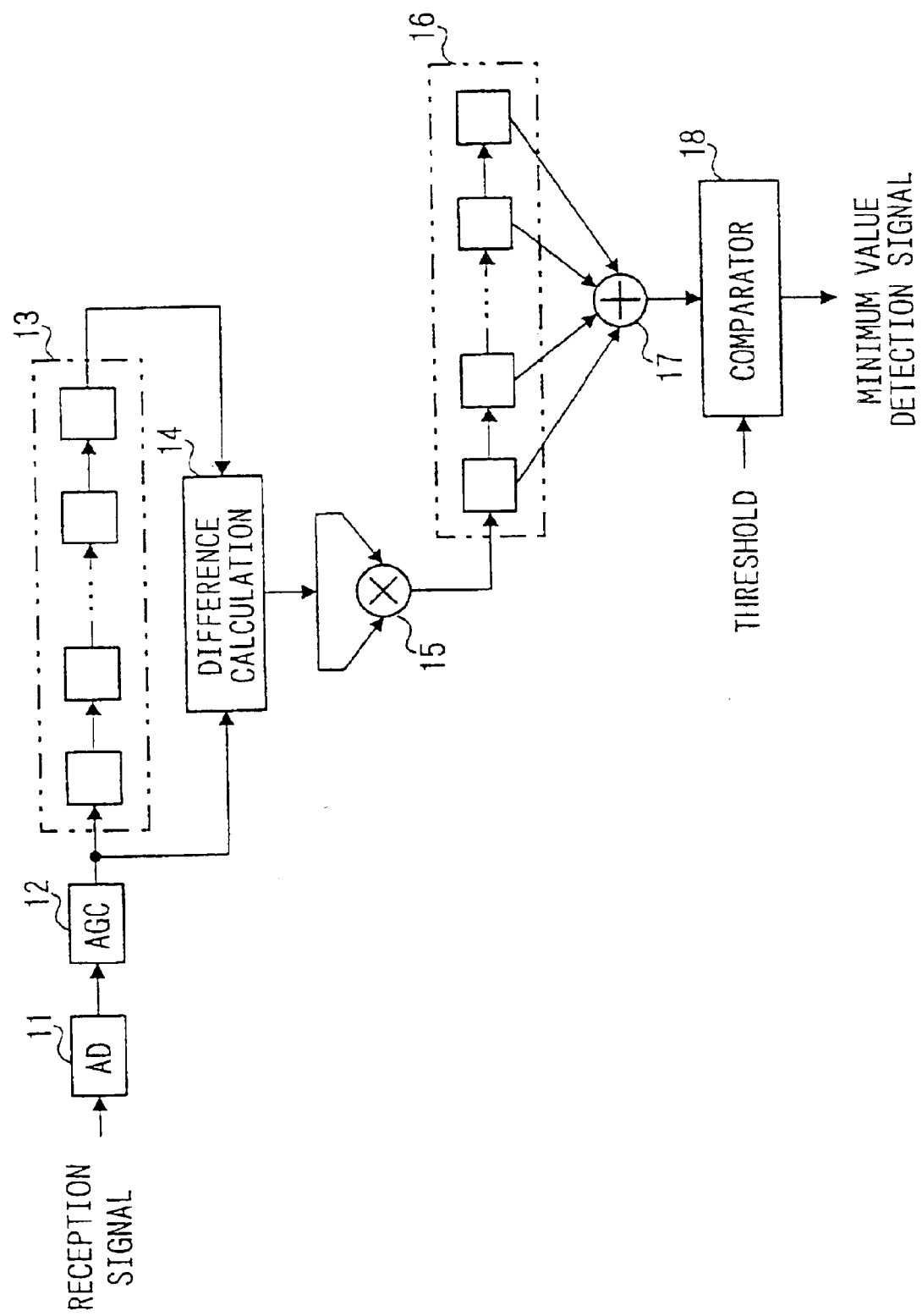
FIG. 1 is a functional block diagram of a reception system of a modem apparatus according to an embodiment of the present invention.

FIG. 1 is a functional block diagram of a reception system of a modem apparatus according to an embodiment of the present invention and is an excerpt of the part that detects a reference timing to ascertain the position of a CP (Cyclic Prefix) signal in an initializing signal. Before explaining the configuration of the part corresponding to reference timing detection to ascertain the CP (Cyclic Prefix) position, an example of the channel connection mode constructed via this modem apparatus will be briefly explained with reference to FIG. 2.

A telephone station serving as a carrier station and a subscriber residence, a user residence, are connected via copper wire cable 21. At the subscriber residence, telephone set 23 and ADSL terminal side apparatus 24 are connected via splitter 22. Furthermore, personal computer 26 as a communication terminal apparatus is connected to ADSL terminal side apparatus 24 via a local network such as 10-BASE-T. At the telephone station, exchange 28 and hub (or router) 29 are connected via ADSL station side apparatus 27.

When communication terminal apparatus 26 carries out a data communication, an initializing signal is sent/received between ADSL terminal side apparatus 24 and ADSL station side apparatus 27 at the telephone station. This embodiment will be explained assuming that this modem apparatus is mounted on ADSL terminal side apparatus 24 at the subscriber residence, but the modem apparatus can also be mounted on ADSL station side apparatus 27. Splitter 22 can be incorporated in ADSL terminal side apparatus 24 and no splitter is required in the case of G.Lite.

In FIG. 1, AD converter 11 samples a reception signal sent via copper wire cable 21 and outputs the sampling data to auto gain controller 12. The sample data with gain adjusted by automatic gain controller 12 is input to first shift register 13 and multiplier 14 in parallel.

First shift register 13 has a register length equivalent to the number of samples of one data unit. That is, in the case of G.Lite, first shift register 13 is configured by 256 delay elements. When certain sample data is input, first shift register 13 outputs the sample data 256 samples ahead to multiplier 14. Therefore, multiplier 14 calculates a product of the sample data input this time by the sample data one data unit ahead (256 samples ahead in the case of G.Lite). The product value output from multiplier 14 is assigned a polarity and input to second shift register 15.

Second shift register 15 has the same register length as that of first shift register 13 and has a structure having a tap to extract stored data from each delay element. Therefore, products of 256 samples from the present sample to the one 256 samples ahead by 256 samples from this sample to the sample 256 samples ahead with polarities assigned respectively are output in parallel to second shift register 15.

Adder 16 adds up the 256 product values with polarities stored in second shift register 15. This addition value is input to minimum value determination circuit 17. Minimum value determination circuit 17 detects the position at which the time series data string made up of the addition values output from adder 16 reaches a minimum value as a reference timing and outputs a minimum value detected signal. As will be described later, the minimum value detected signal will indicate the position of the boundary between a first symbol and second symbol of the SEGUE signal and the position 9 symbols later from there (256 samples×9) is the position of the beginning of the CP (Cyclic Prefix) signal.

Here, an algorithm for detecting a reference timing used to ascertain the CP position from an initializing signal will be explained.

Figure 3:
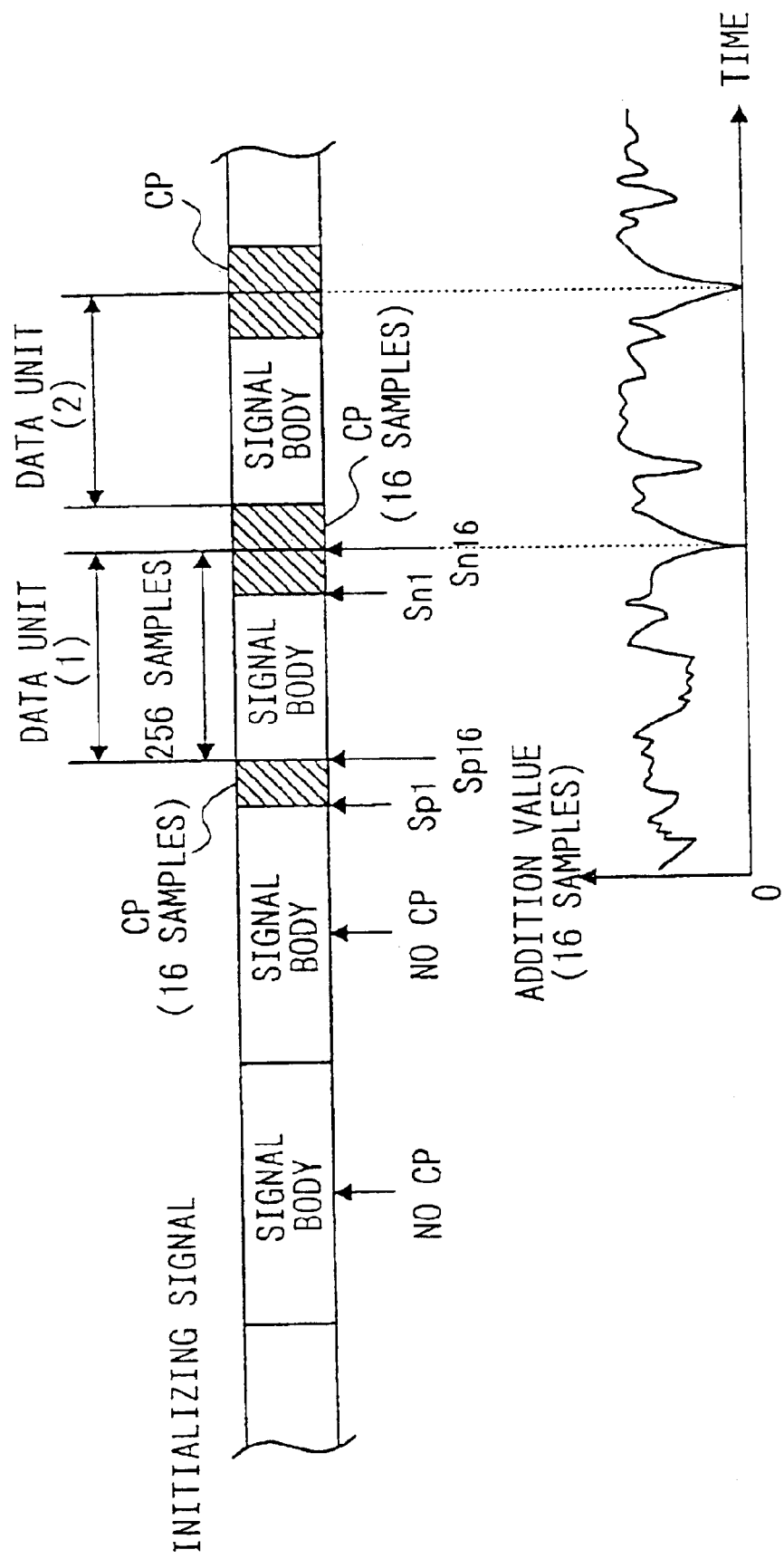
FIG. 3 illustrates an initialization sequence based on G.992.2.

FIG. 3 illustrates an initialization sequence according to G.Lite (G.992.2). The ADSL station side apparatus installed at the station sends 10 symbols of SEGUE signal (C-SEQUE1) after sending 1024 symbols of REVERB signal (C-REVERB3) in the initialization sequence. Furthermore, after sending 10 symbols of SEGUE signal (C-SEQUE1), addition of a CP (Cyclic Prefix) signal is started from the immediately following transmission signal. In the same way, the ADSL terminal side apparatus installed at the subscriber residence sends 1024 to 1056 symbols of REVERB signal (R-REVERB2) and then sends 10 symbols of SEGUE signal (R-SEGUE1) in the initialization sequence. Furthermore, after sending 10 symbols of SEGUE signal (RSEGUE1), addition of a CP (Cyclic Prefix) signal is started from the immediately following transmission signal.

Figure 4:
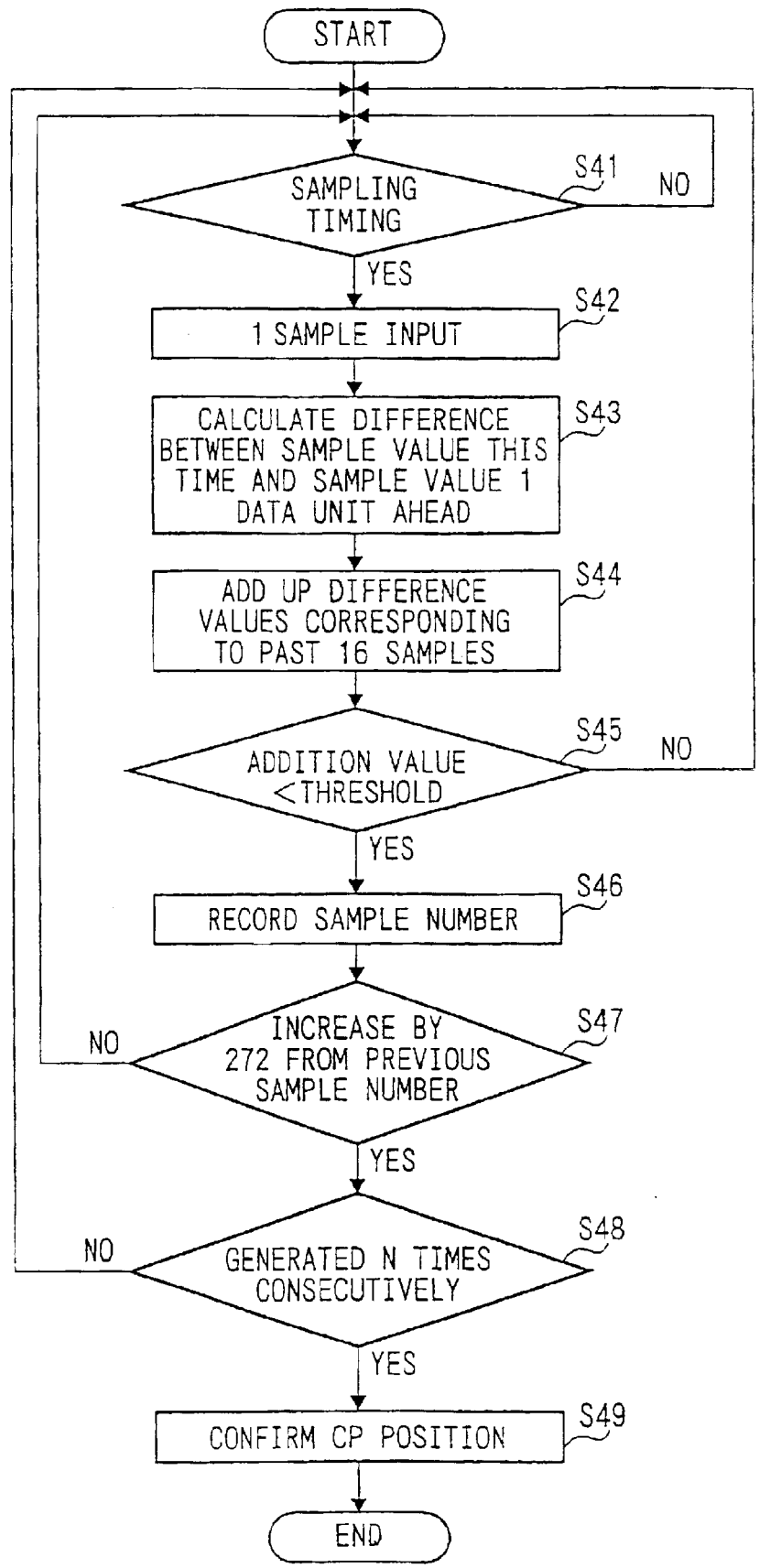
FIG. 4 illustrates an extract of a portion of an initialization signal including parts before and after a SEGUE signal.

FIG. 4 shows the initialization sequence of the ADSL station side apparatus and shows a symbol series of a section where a REVERB signal (C-REVERB3) is changed to a SEGUE signal (C-SEGUE1) and a section where a SEGUE signal (C-SEGUE1) is changed to the following transmission signal.

In the case of G.Lite (G.992.2), one data unit (signal body) corresponding to one symbol of both the REVERB signal and SEGUE signal is configured by 256 data items. The REVERB signal (C-REVERB3) repeats 256 data patterns for 1024 symbols and the SEGUE signal (C-SEGUE1) repeats 256 data patterns for 10 symbols.

The REVERB signal is the following signal defined in ITU-T G.992.2 or G.992.1. As a data string that forms a data stream corresponding to one symbol, the following pseudo-random sequence is generated.

In the case of upstream:

$d_n = 1$ for $n = 1$ to 6

$d_n = d_{n-5}$ EXOR $d_{n-6}$ (modulo2) for $n = 7$ onward

In the case of downstream:

$d_n = 1$ for $n = 1$ to 9

$d_n = d_{n-4}$ EXOR $d_{n-9}$ (modulo2) for $n = 10$ onward

The above sequence is divided every 2 bits and allocated on a complex plane expressed by X and Y axes as follows. The "EXOR" above denotes an exclusive OR.

00 → X+Y+

01 → X+Y−

11 → X−Y−

10 → X−Y+

Suppose a sequence of 128 or 256 complex numbers allocated on the complex plane is:

$Z_1 Z_2 \ldots Z_m$ where the first of the complex sequence is 00 and the portion called a "pilot tone" is (X+Y+).

Furthermore, an inverse Fourier transform is applied to a sequence that links the above complex sequence with a complex sequence that constitutes Hermitian symmetry with respect to the relevant complex sequence:

$Z_1 Z_2 \ldots Z_m$ Conjugate of $Z_m \ldots$ conjugate of conjugate $Z_1$ of $Z_2$ The 256 real number components of this inverse Fourier transform result constitute a REVERB signal.

The SEGUE signal is formed as follows: The above REVERB signal is rotated 180 degrees on the complex plane except 00 on the complex plane and the position X+Y+ called a "pilot tone" and the following complex sequence is obtained:

$Z_1 Z_2 \ldots Z_m$

Hermitian symmetry with this is taken as follows:

$Z_1 Z_2 \ldots Z_m$ Conjugate of $Z_m \ldots$ conjugate of conjugate $Z_1$ of $Z_2$ And this is subjected to an inverse Fourier transform. The 256 real number components of this inverse Fourier transform result constitute a SEGUE signal.

Figure 5:
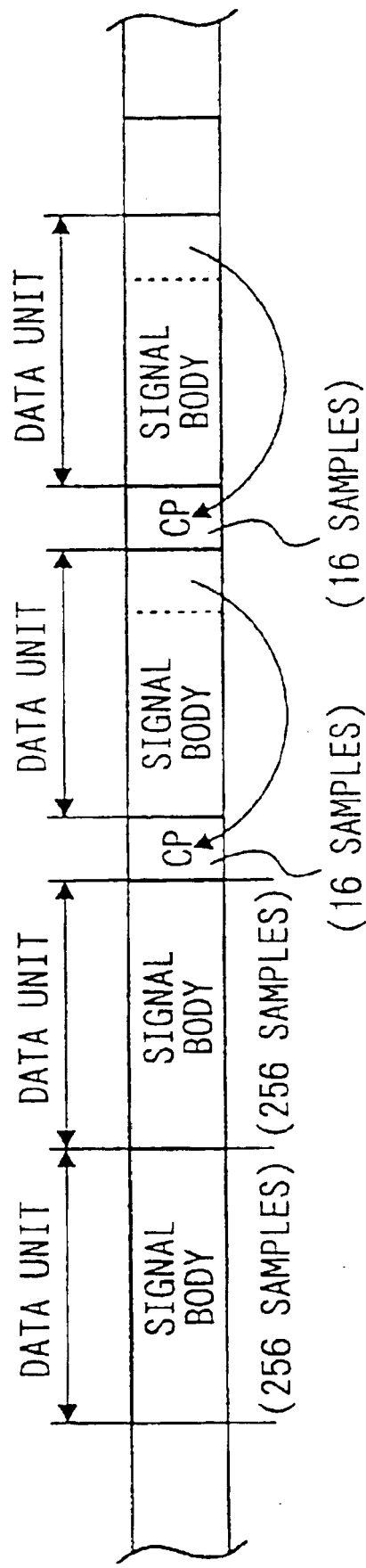
FIG. 5 illustrates a relationship between a data pattern of a REVERB signal and SEGUE signal and adder output.

The REVERB signal and SEGUE signal generated according to the above rule are signals with phases mutually inverted by virtually 180 degrees. FIG. 5 shows that the REVERB signal and SEGUE signal have phases mutually inverted by virtually 180 degrees. The curve described in correspondence in time with the REVERB signal and SEGUE signal in FIG. 5 represents addition values with polarities output from adder 16 at different sample time points. As shown in FIG. 5, the phases of the last symbol (1024th symbol) of the REVERB signal and the first symbol (1st symbol) of the SEGUE signal are opposite over one entire symbol. For this reason, at the reception terminal, individual sample data items forming the first symbol of the SEGUE signal and the sample data (individual sample data items forming a REVERB signal) one data unit (256 samples) ahead from each sample time point have opposite polarities. Therefore, the product of the present sample data by the sample data one data unit ahead in the above positional relationship always shows a negative polarity. In the period of each sample data item during which the present sample data forms the first symbol of the SEGUE signal, each product value has a negative polarity. Therefore, adding product values corresponding to the past one data unit (256 samples) to the individual sample data items that form the first symbol of the SEGUE signal shows a minimum value as shown in FIG. 5.

This embodiment detects a minimum value from the time series data of addition values output from adder 16. As shown in FIG. 4 and FIG. 5, since the position at which the above minimum value is detected is 9 symbols (256×9) before the position of the beginning of the CP (Cyclic Prefix) signal, once the position of the minimum value above is detected, the position at which the CP (Cyclic Prefix) signal starts can be identified using that position as a reference timing.

Figure 6:
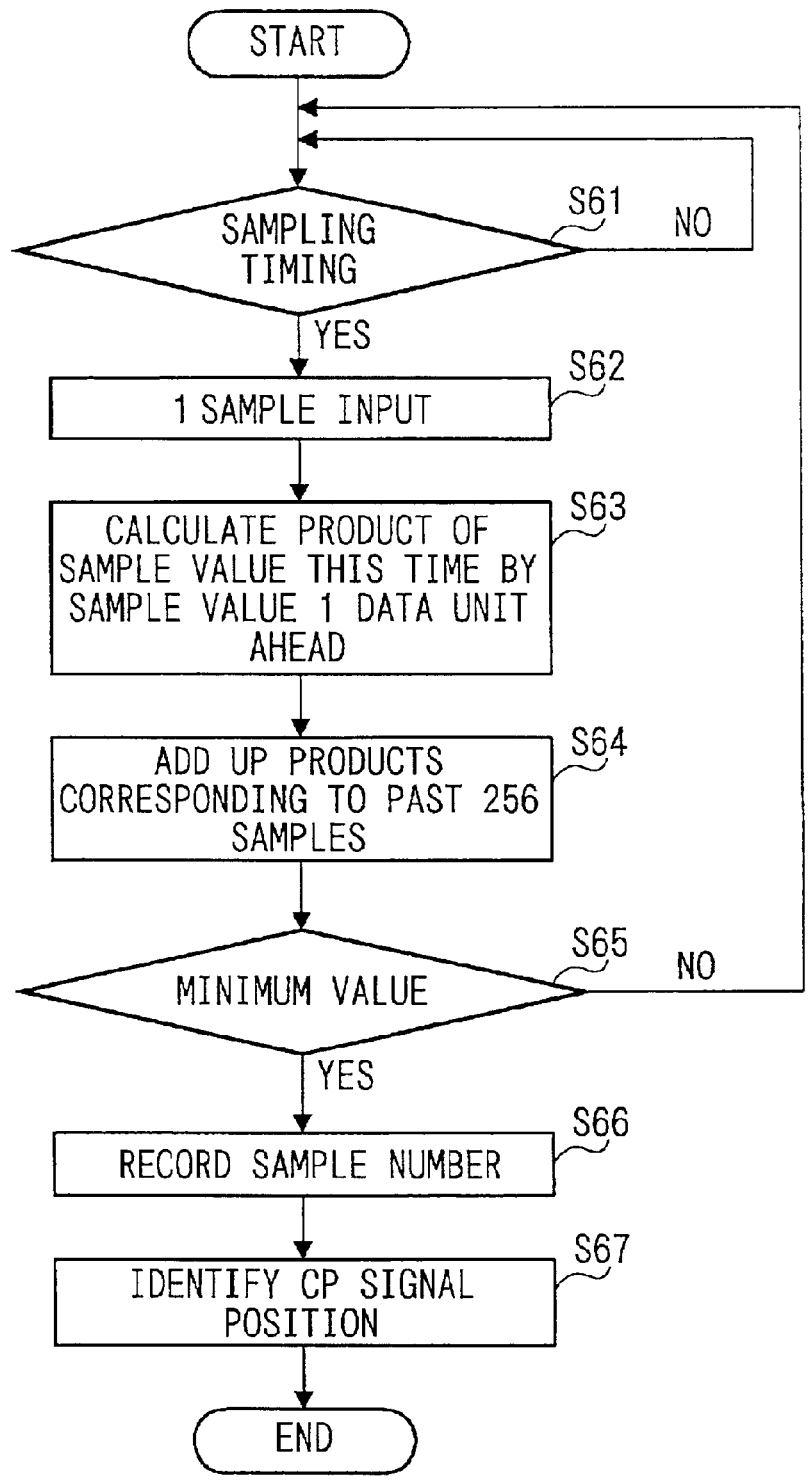
FIG. 6 is a flow chart of a process to detect a reference timing of CP (Cyclic Prefix) detection in the modem apparatus according to the embodiment above.
Figure 7:
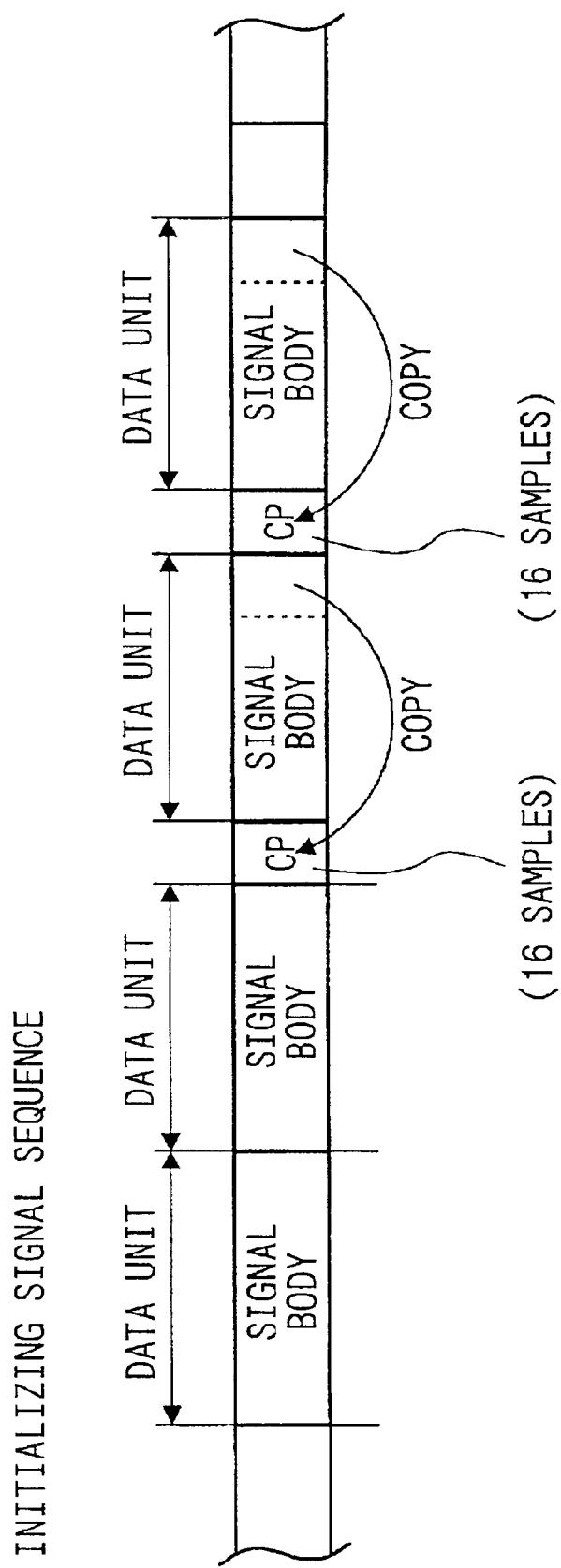
FIG. 7 is a data sequence diagram of an initializing signal.

FIG. 1 shows the hardware circuit to detect a reference timing with regard to the CP (Cyclic Prefix) signal in the modem apparatus above, but it is possible to execute the processing from AD converter 11 onward by software. FIG. 6 is a flow chart to execute CP (Cyclic Prefix) detection processing in the modem apparatus above.

At a sampling time (S61), one sample is input (S62) and a product of the sample data this time by sample data one data unit ahead is calculated with a polarity (S63). Then, product values for 256 samples corresponding to the past one data unit with polarities are added (S64). Then, it is determined whether the addition value this time is a minimum value (S65). An algorithm for determining a minimum value is not particularly limited.

The sampling number at the position at which the minimum value is detected in step S65 is recorded (S66) and the CP (Cyclic Prefix) signal position is identified from the recorded sampling number (S67). After the CP (Cyclic Prefix) signal position is identified, the data unit of the data signal sent after the initializing signal is extracted and demodulated with reference to the CP (Cyclic Prefix) signal added at the beginning of the data unit.

Figure 2:
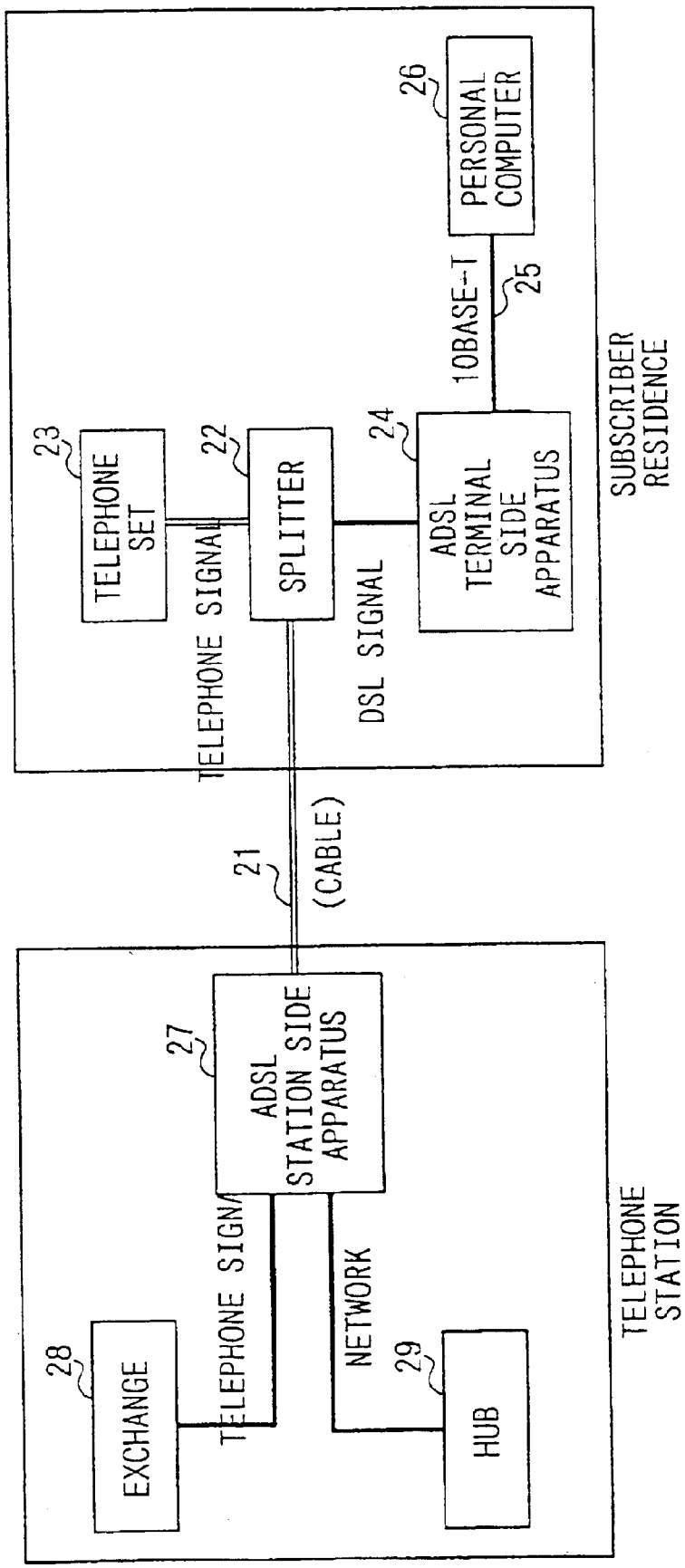
FIG. 2 illustrates a connection mode according to an ADSL system.

In the connection mode shown in FIG. 2, ADSL terminal side apparatus 24 is connected to communication terminal apparatus 26 via local network 25, but it is also possible to use a mode in which communication terminal apparatus 26 incorporates ADSL terminal side apparatus 24. Furthermore, communication terminal apparatus 26 is not limited to a personal computer, but can be any other apparatus equipped with a facsimile apparatus (including Internet fax) and a communication function.

The present invention described above can provide a modem apparatus, communication apparatus and communication control method capable of accurately detecting a CP (Cyclic Prefix) signal sent at some midpoint of the initializing signal without any detection error and precisely demodulating a DMT-modulated signal.

The present invention is not limited to the above-described embodiments, and various variations and modifications may be possible without departing from the scope of the present invention.

What is claimed is:

1. A modem apparatus comprising:
   a sampling section that samples a reception signal;
   a multiplier that calculates a product of the present sampling data by the sampling data one data unit ahead;
   an adder that adds up product values calculated for every sampling by adding product values calculated from previous samples occurring one data unit in advance; and
   a detector that detects a reference timing with regard to a cyclic prefix signal using an addition value calculated by said adder.

2. The modem apparatus according to claim 1, wherein said detector detects a minimum value from a time series data of said addition value and recognizes a sampling timing corresponding to the detected minimum value as said reference timing.

3. The modem apparatus according to claim 1, wherein said detector detects a sampling timing at which a sum of products of each sampling data item corresponding to a final symbol of a REVERB signal sent in an initializing signal by each sampling data item corresponding to a first symbol of a SEGUE signal sent following said REVERB signal is output as said reference timing.

4. The modem apparatus according to claim 2, wherein a position nine symbols ahead of the sampling timing corresponding to said minimum value is recognized as a beginning of the cyclic prefix signal.

5. An ADSL terminal side apparatus equipped with the modem apparatus according to claim 1.

6. An ADSL station side apparatus equipped with the modem apparatus according to claim 1.

7. A communication apparatus equipped with the modem apparatus according to claim 1.

8. A communication control method comprising:
   sampling a reception signal;
   calculating a product of the present sampling data by the sampling data one data unit ahead;
   adding product values calculated for every sampling by adding product values calculated from previous samples occurring one data unit in advance; and
   detecting a reference timing with regard to a cyclic prefix signal using an addition value.

9. The communication control method according to claim 8, wherein a minimum value is detected from a time series data of said addition value and a sampling timing corresponding to the detected minimum value is recognized as said reference timing.

10. The communication control method according to claim 8, wherein a sampling timing at which a sum of products of each sampling data item corresponding to a final symbol of a REVERB signal sent in an initializing signal by each sampling data item corresponding to a first symbol of a SEGUE signal sent following said REVERB signal is output as said reference timing.

11. A modem apparatus, receiving, in a initialization sequence, symbols of a signal to which a cylic prefix signal is added, after receiving a predetermined number of symbols of a SEGUE signal, the modem apparatus comprising:
   a sampler configured to sample a received signal by each predetermined symbol;
   a multiplier configured to multiply sampling data of a present symbol by sampling data of one symbol unit in advance;
   an adder configured to cumulatively add an output value of the multiplier, the output value having a polarity;

a detector configured to detect a minimum value output by the adder;

a judger configured to judge a starting position of the cyclic prefix signal, based on the minimum value, the minimum value indicating a boundary between a first symbol of the SEGUE signal and a second symbol of the SEGUE signal, the starting position of the cylic prefix signal coming after the predetermined numbers of symbols of the SEGUE signal.

12. The modem apparatus according to claim 11, wherein the predetermined numbers of symbols of the SEGUE signal comprises ten symbols of the SEGUE signal.

13. The modem apparatus according to claim 12, wherein the judger judges that the starting position of the cyclic prefix signal comes after the ninth symbol of the SEGUE signal from the detection of the minimum value.

14. An ADSL terminal side apparatus equipped with the modem apparatus according to claim 11.

15. An ADSL station side apparatus equipped with the modem apparatus according to claim 11.

16. A communication apparatus equipped with the modem apparatus according to claim 11.

17. A communication control method, symbols of a signal to which a cylic prefix signal is added, being received after a predetermined number of symbols of a SEGUE signal being received in a initialization sequence, the communication control method comprising:

sampling a received signal by each predetermined symbol;

multiplying sampling data of a present symbol by sampling data of one symbol in advance;

cumulatively adding an output value of the multiplier, the output value having a polarity;

detecting a minimum value output by the adder;

judging a starting position of the cyclic prefix signal, based on the minimum value, the minimum value indicating a boundary between a first symbol of the SEGUE signal and a second symbol of the SEGUE signal, the starting position of the cylic prefix signal coming after the predetermined numbers of symbols of the SEGUE signal.

* * * * *